United States Patent
Nylander et al.

(10) Patent No.: US 9,179,377 B2
(45) Date of Patent: Nov. 3, 2015

(54) HANDOVER IN RELATION TO CELL IDENTITY AMBIGUITY

(75) Inventors: Tomas Nylander, Värmdö (SE); Tomas Hedberg, Stockholm (SE); Jari Vikberg, Järna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 505 days.

(21) Appl. No.: 13/263,012

(22) PCT Filed: Jun. 30, 2011

(86) PCT No.: PCT/SE2011/050887
§ 371 (c)(1),
(2), (4) Date: Oct. 5, 2011

(87) PCT Pub. No.: WO2008/113373
PCT Pub. Date: Sep. 25, 2008

(65) Prior Publication Data
US 2013/0003695 A1    Jan. 3, 2013

(51) Int. Cl.
*H04B 7/212* (2006.01)
*H04W 36/00* (2009.01)

(52) U.S. Cl.
CPC ...... *H04W 36/0083* (2013.01); *H04W 36/0072* (2013.01)

(58) Field of Classification Search
CPC .................................................. H04W 36/00
USPC ........... 370/328–339, 448; 455/550, 436, 422
See application file for complete search history.

(56) References Cited

U.S. PATENT DOCUMENTS

| | | | | |
|---|---|---|---|---|
| 2008/0207207 | A1* | 8/2008 | Moe et al. | 455/439 |
| 2010/0304748 | A1* | 12/2010 | Henttonen et al. | 455/436 |
| 2013/0267233 | A1* | 10/2013 | Moe et al. | 455/437 |

FOREIGN PATENT DOCUMENTS

| | | | | |
|---|---|---|---|---|
| WO | 2005099185 A1 | | 10/2005 | |
| WO | WO2008113373 | * | 9/2008 | ............ H04W 36/00 |
| WO | WO 2008113373 A1 | * | 9/2008 | |
| WO | 2009065053 A2 | | 5/2009 | |

OTHER PUBLICATIONS

3GPP T63-36.300 V8.7.0 (Dec. 2008), Release 8.*
3GPP TS 36.300(3GPP TS 36.33 V8.7.0, Dec. 2008).*
3GPP TS 36.300 V8.7.0, Dec. 2008.*

(Continued)

*Primary Examiner* — Iqbal Zaidi
(74) *Attorney, Agent, or Firm* — Coats & Bennett, PLLC

(57) ABSTRACT

The invention relates to handover of a mobile station (12) from a source cell to a target cell when the identity of the target cell in a wireless communication network (10, 11) is ambiguous, a source base station (14) defining the source cell receives an event from the mobile station comprising a cell identifier, investigates if there are more cells in the neighborhood sharing the same cell identifier and sends a handover instruction to the mobile station comprising an identity ambiguity indicator if there are more cells sharing the same cell identifier. The mobile station autonomously initiates establishment of a connection to a target base station defining the target cell based on the identity ambiguity indicator in order to effect handover.

24 Claims, 10 Drawing Sheets

(56) References Cited

OTHER PUBLICATIONS

NTT Docomo, Inc., "A solution to resolve potential PCI confusion at handover", 3GPP TSG RAN WG2 LTE RRC Ad Hoc, Jun. 5-6, 2008, pp. 1-4, Sophia Antipolis, France, Tdoc-R2-082963.

Qualcomm Europe, "Optimized handover in the presence of PCI confusion", 3GPP TSG RAN WG2 62bis, Jun. 30-Jul. 4, 2008, pp. 1-6, Warsaw, Poland, Tdoc-R2-083268.

Qualcomm Europe, et al., "Network based solutions to inbound mobility in the presence of PCI confusion", 3GPP TSG-RAN WG3 #64, May 4-8, 2008, pp. 1-4, San Francisco, US, R3-091027.

3RD Generation Partnership Project, Technical Specification Group Services and System Aspects; General Packet Radio Service (GPRS) enhancements for Evolved Universal Terrestrial Radio Access Network (E-UTRAN) access (Release 10), Mar. 2011, pp. 1-278, 3GPP TS 23.401 V10.3.0.

\* cited by examiner

HANDOVER IN RELATION TO CELL IDENTITY AMBIGUITY

TECHNICAL FIELD

The invention relates to handover in wireless communication networks. More particularly, the invention relates to a method and handover handling node in a wireless communication network for handing over a mobile station from a source cell to a target cell in a wireless communication network a method in a mobile station being handed over from a source cell to a target cell in a wireless communication network and such a mobile station, a method and a node for controlling the handover process in a target cell of a wireless communication network, as well as a method and network node in a wireless communication network for assisting in the handing over of a mobile station from a source cell defined by a source base station to a target cell defined by a target base station.

BACKGROUND

One trend in mobile communication networks is that they are becoming more and more heterogeneous. This means that the base stations and the cells they provide vary considerably. There may here be macro cells covering large areas combined with much smaller pico cells covering hot spots. A macro base station does typically transmit with much higher power than a pico cell and hence provides much larger cells. In addition to this it is possible that the networks also includes femto cells, where the base stations that provide these cells are even smaller and transmit with even lower power levels. These cells are often provided domestically or in households.

As a mobile station is moving in such a network, it is common to hand it over from one cell to another. In order to be able to perform handover, the cells have to be possible to identify. For this reason the cells are provided with cell identifiers. The identifiers used for handover are then often shared by several cells, i.e. not unique. However, the re-use of cell identifiers has traditionally been such that the cells that share the same identifier are provided at long distances from each other and therefore the same identifier should not appear in cells within the same neighbourhood. This is typically done by the operator in network planning.

Now with the introduction of pico and femto cells, this may not be possible any more. There may be so many cells that several pico cells may use the same cell identifier in the vicinity of a macro cell. There may here be even more femto cells in a neighbourhood.

Furthermore, a network operator may also have no real control of where a femto cell is placed. Therefore also several of these may have the same non-unique cell identifier.

Since it is possible for a target cell, i.e. a cell to which a mobile station may need to be handed over, to share a cell identifier with other cells, there may occur problems when performing handover from a source cell, i.e. a cell with which a mobile station is actively communicating.

One way to handle this is described in WO 2008/113373, where a forced handover command is used by the source base station to command a mobile station to perform handover to a target base station for which a cell global identifier is not known in the source base station. The source base station also provides information about its own cell global identifier to the mobile station that forwards the information to the target base station. Target and source base station may then communicate for effecting handover.

Another way to address this is to be found in 3GPP TS 36.300 in a procedure called "inbound mobility to E-UTRAN CSG cells". Here principles similar to Automatic Neighbour Relation (ANR) are applied for letting the mobile station provide more information to the source cell to uniquely identify the target cell.

This type of activity functions well. However, there is still room for improvement when performing handover to a cell with non-unique cell identifier.

SUMMARY

The invention is therefore directed towards improving handover when there is an ambiguity concerning the identity of a target base station to which a mobile station may need to be handed over.

One object of the invention is thus to improve handover when there are several possible target cells sharing the same non-unique cell identifier.

This object is according to a first aspect of the invention achieved through a method of handing over a mobile station from a source cell to a target cell in a wireless communication network when the identity of the target cell in the wireless communication network is ambiguous. The method is performed by a handover handling node and comprises:
receiving an event from a mobile station, where the event comprises a cell identifier associated with a cell defined by a desired target base station and to which the mobile station may need to be handed over, determining that the mobile station needs to be handed over to the target base station, investigating if there are more cells in a neighbourhood sharing the same cell identifier, providing, if there are more cells sharing the same cell identifier, an identity ambiguity indicator, where the identity ambiguity indicator is provided for triggering the mobile station to autonomously initiate establishment of a connection to the desired target base station during a handover, and
sending a handover instruction to the mobile station, where the handover instruction comprises the identity ambiguity indicator.

The object is according to a second aspect of the invention achieved through a handover handling node in a wireless communication network for handing over a mobile station from a source cell to a target cell when the identity of the target cell in the wireless communication network is ambiguous. This node comprises a communication interface and a control unit. The control unit comprises a handover deciding element configured to receive an event from a mobile station, where the event comprises a cell identifier associated with a cell defined by a desired target base station to which the mobile station may need to be handed over, to determine that the mobile station needs to be handed over to the target base station, and to send a handover instruction to the mobile station. The control unit also comprises an investigating element configured to investigate if there are more cells in a neighbourhood sharing the same cell identifier and provide an identity ambiguity indicator if there are more cells sharing the same cell identifier, where the identity ambiguity indicator is provided for triggering the mobile station to autonomously initiate establishment of a connection to the desired target base station during a handover and is comprised in the handover instruction.

Another object of the invention is to enable a mobile station to be handed over to a target cell in an improved way, when there is an ambiguity concerning the identity of the target cell.

This object is according to a third aspect of the invention achieved through a method in a mobile station that is handed over from a source cell to a target cell in a wireless communication network when the identity of the target cell in the wireless communication network is ambiguous. The method comprises:

reporting an event to a source base station, where the event comprises a cell identifier associated with a cell defined by a desired target base station, receiving a handover instruction from the source base station, where the handover instruction comprises an identity ambiguity indicator, and autonomously initiating the establishment of a connection to the desired target base station as triggered by the identity ambiguity indicator in order to effect handover to the desired target base station.

This object is according to a fourth aspect of the invention also achieved by a mobile station for being handed over from a source cell to a target cell in a wireless communication network when the identity of the target cell in the wireless communication network is ambiguous. The mobile station comprises a wireless communication interface, a radio communication unit and a control unit. The control unit in turn comprises an event reporting element configured to report an event to a source base station, where the event comprises a cell identifier associated with a cell defined by a desired target base station, and a handover handling element configured to receive a handover instruction from the source base station, where the handover instruction comprises an identity ambiguity indicator, and autonomously initiate the establishment of a connection to the desired target base station as triggered by the identity ambiguity indicator in order to effect handover to the desired target base station.

Another object of the present invention is to perform improved handover in a target base station, when the identity of a cell provided by this target base station is ambiguous.

This object is according to a fifth aspect of the invention achieved through a method for controlling a handover process in a target cell, the handover process concerning handover of a mobile station from a source cell defined by a source base station to the target cell, which is defined by a target base station, in a wireless communication network when the identity of the target cell in the wireless communication network is ambiguous. The method comprises:

receiving a secured hand over reference and an identifier of the source base station from a mobile station via a connection established by said mobile station, requesting handover of the mobile station from the source base station using the secured handover reference, receiving, from the source base station, handover context data as a response to the request, and completing handover of the mobile station.

This object is according to a sixth aspect of the invention achieved through a node for controlling a handover process in a target cell, the handover process concerning handover of a mobile station from a source cell defined by a source base station to the target cell, which is defined by a target base station in a wireless communication network when the identity of the target cell in the wireless communication network is ambiguous. The node comprises a communication interface and a control unit. The control unit comprises a handover requesting element configured to receive a secured handover reference and an identifier of the source base station from a mobile station via a connection established by the mobile station and request handover of the mobile station from the source base station using the secured handover reference, and a handover processing element configured to receive handover context data as a response to the request from the source base station and complete a handover of the mobile station.

Another object of the invention is to assist in an improved handover of a mobile station to a target base station when there is an ambiguity concerning the identity of a target cell defined by the target base station.

This object is according to a seventh aspect of the invention achieved through a method of assisting in the handing over of a mobile station from a source cell defined by a source base station to a target cell defined by a target base station in a wireless communication network when the identity of the target cell in the wireless communication network is ambiguous. The method comprises:

receiving a message from a target base station, where the message comprises a request for handover of a mobile station with a secured handover reference, an identifier of the source base station and an identifier of the target base station, locating a transport network identifier of the source base station, forwarding the message to the source base station, receiving, from the source base station, a message including handover context data as a response to the request, said message comprising an identifier of the target base station, and forwarding the handover context data to the target base station based on the received identifier of the target base station.

This object is according to an eighth aspect achieved through a network node of a wireless communication network for assisting in the handing over of a mobile station from a source cell defined by a source base station to a target cell defined by a target base station when the identity of the target cell in the wireless communication network is ambiguous. The node comprises a communication interface and a control unit. The control unit comprises a base station locating element configured to receive a message from a target base station comprising a request for handover of a mobile station and including a secured handover reference, an identifier of the source base station and an identifier of the target base station, and locate a transport network identifier of the source base station, a message handling element configured to forward the message to the source base station, receive, from the source base station, a message including handover context data as a response to the request, said message comprising an identifier of the target base station, and forward the handover context data to the target base station based on the received identifier of the target base station.

The invention has a number of advantages. It allows handover to be made even if there is an ambiguity concerning the identity of a target base station. This may furthermore be achieved almost instantly after a failed handover.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The present invention concerns handover in a wireless communication network, for instance a mobile communication network like a Long-Term Evolution (LTE), Universal Mobile Telecommunications System (UMTS) and Global System for Mobile Communications (GSM). These are just a few examples of networks where the invention can be implemented.

The invention concerns handover problems that are predominant in Heterogeneous Networks or HetNets, where there is a mixture of base station types, such as macro, pico and even femto base stations.

Heterogeneous Networks apply to all different Radio Access Technologies (RAT) and also to the case where multiple RATs are deployed in the same geographical area. In the following description the network will be described in the form of a Long Term Evolution (LTE)/System Architecture Evolution (SAE) network as an example. This type of network may furthermore be divided into an access network and a core network. The other name for the LTE/SAE network is the Evolved Packet System (EPS) that comprises both the Evolved UTRAN (E-UTRAN) radio access network and the Evolved Packet Core (EPC) core network, where UTRAN is an acronym for UMTS Terrestrial Radio Access Network. More details about these networks may be found in 3GPP TS 23.401, which is herein incorporated by reference.

Figure 1:
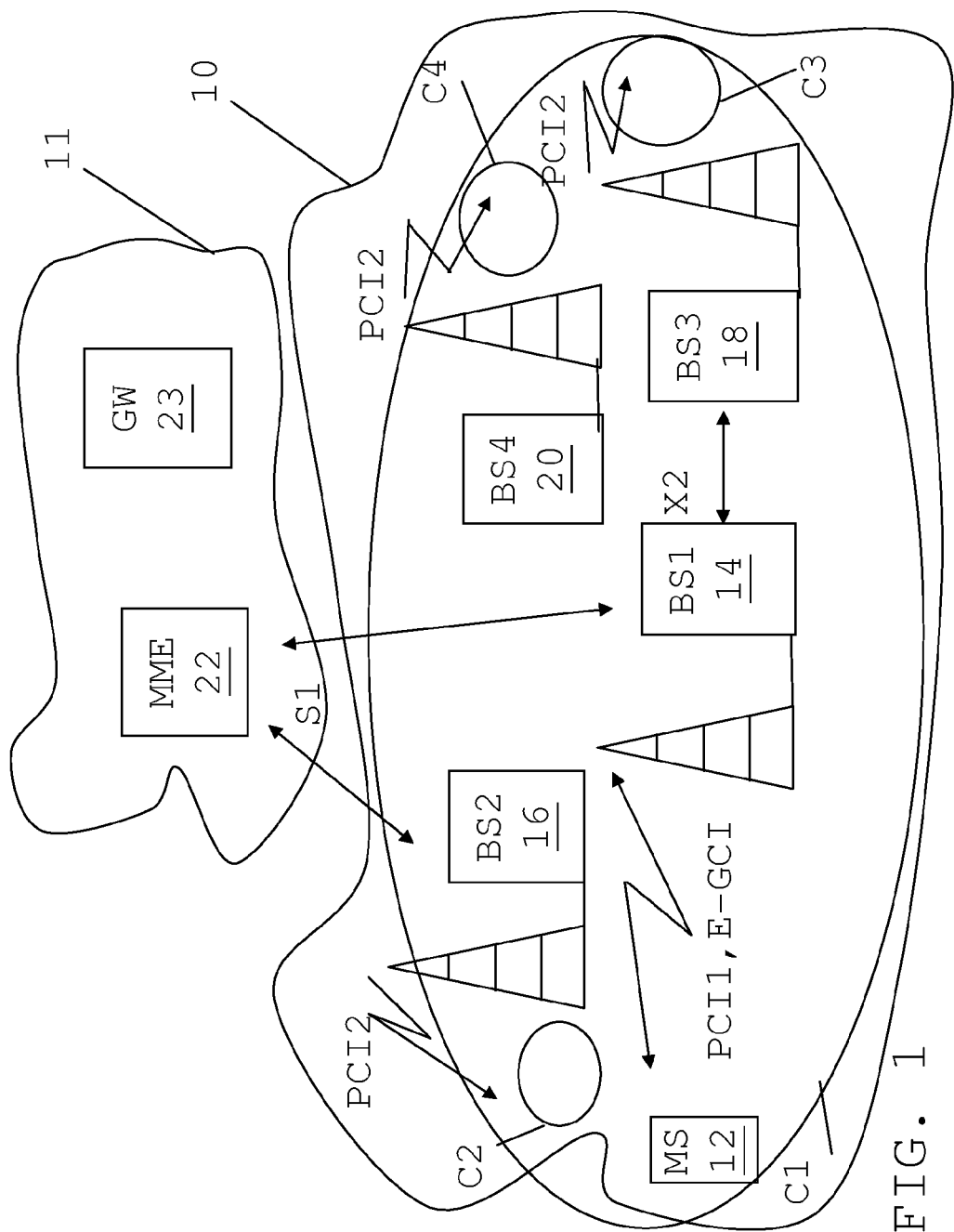
FIG. 1 schematically shows a wireless communication network comprising a number of base stations and a mobile station.

In LTE a base station is normally termed evolved Node B (eNB). FIG. 1 shows an exemplifying access network 10 comprising four base stations, with a first base station BS1 14, a second base station BS2 16, a third base station BS3 18 and a fourth base station BS4 20. The first base station 14 is acting as a serving or source base station in relation to a mobile station 12 that is active by communicating in a cell C1 that is defined by the first radio base station BS1 14. The first base station BS1 14 is here as an example a macro base station, while the second, third and fourth base stations 16, 18 and 20 are as an example pico and/or femto base stations. Each base station defines at least one cell, and a cell defined by a base station also has two cell identifiers, a unique cell identifier in the form of a E-UTRAN Cell Global Identifier E-CGI and a non-unique shared cell identifier in the form of a physical cell identifier PCI. It can here be seen that the first base station transmits both a first non-unique cell identifier PCI1 as well as an E-UTRAN cell global identifier E-CGI, while the second, third and fourth base stations are shown as only transmitting a non-unique cell identifier PCI2. They thus share the same non-unique cell identifier. They use the same second non-unique cell identifier. They do also have and transmit E-UTRAN cell global identifiers. However, these have here been omitted because they are not needed for understanding the invention.

It should here be realised that the access network 10 would normally comprise several more base stations, each forming one or more cells. However, only four are shown here in order to focus on the principles of the invention. Here cells being defined by different base stations share the same non-unique cell identifier and these cells are furthermore physically close enough for being possible candidates for a handover from the source macro cell 14.

In the network there is also a Mobility Management Entity MME 22, which is provided in a core network 11 of the wireless or communication network. There is furthermore provided a gateway 23 also in the core network 11. Generally an MME is responsible for signalling in respect of a mobile station, while a gateway is responsible for user plane communication to and from the mobile stations.

The base stations can be communicating with each other using a so-called X2 interface, where communication between the first and the third base stations 14 and 18 is depicted using this interface. Base stations can also communicate with entities in the core network, such as the MME 22 using a so-called S1 interface. The first and the second base stations 14 and 16 are here shown as being involved in such communication with the MME 22 in FIG. 1. These interfaces are defined in the standard 3GPP TS 36.300.

Here it should be realized that base stations can communicate with each other also using the S1 interface, in which a core network entity, like the MME is acting as a relay node. This is indicated through the first and the second base stations 14 and 16 being shown as involved in such communication.

Figure 2:
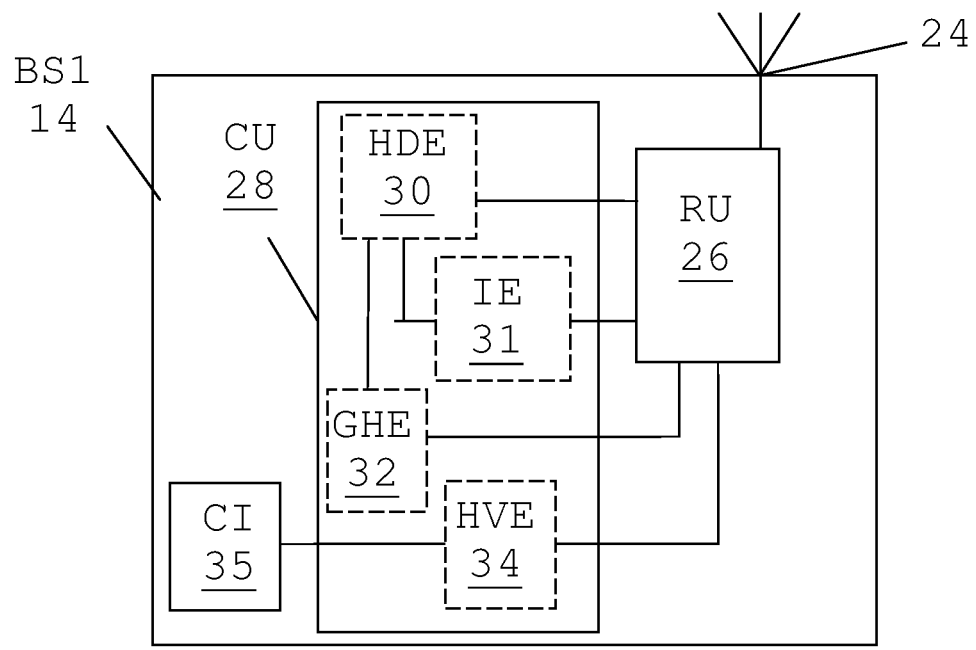
FIG. 2 shows a block schematic of a source base station according to a first embodiment of the invention.

FIG. 2 schematically shows a block schematic of the first base station 14. This base station here forms a handover handling node. It comprises a control unit CU 28, a first communication interface 24 and a second communication interface CI 35. As the handover handling node is a base station in this variation of the invention, the first communication interface is a wireless communication interface, and here in the form of an antenna 24, which is connected to a radio communication unit RU 26. The radio communication unit 26 is in turn connected to a handover deciding element HDE 30, to an investigating element IE 31, to a group handling element GHE 32 and to a handover verifying element HVE 34, all provided in the control unit 28. Here the handover deciding element 30 is furthermore also connected to the investigating element 31 and to the group handling element 32. The second communication interface 35 is connected to the handover verifying element 34 and is an interface to a transport network used for communication between the nodes of the network. This transport network may be based on IP (Internet Protocol) protocols.

Figure 3:
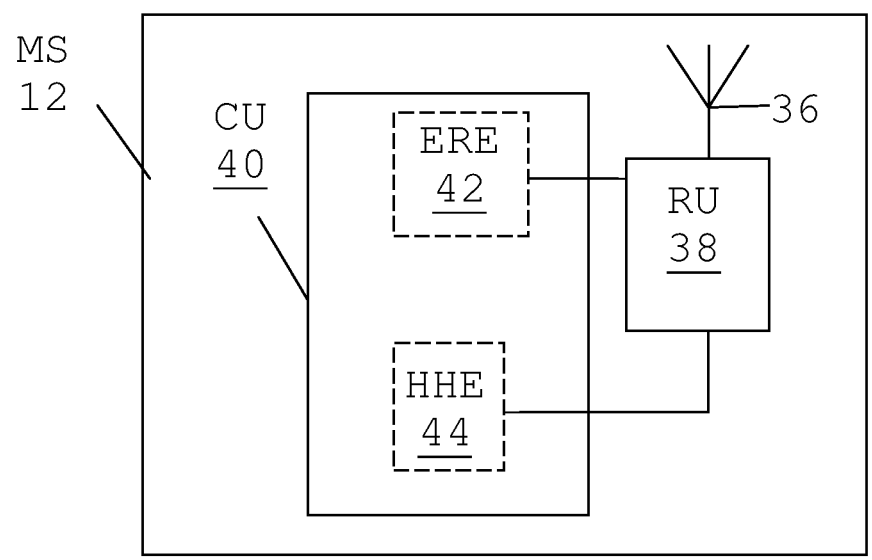
FIG. 3 shows a block schematic of a mobile station according to the same embodiment of the invention.

FIG. 3 shows a block schematic of the mobile station 12. Also the mobile station 12 comprises a control unit CU 40, which is connected to a radio communication unit RU 38. The radio communication unit 38 is in turn connected to an antenna 36. Here the radio communication unit 38 is more particularly connected to an event reporting element ERE 42 as well as to a handover handling element HHE 44 both provided in the control unit 40.

Figure 4:
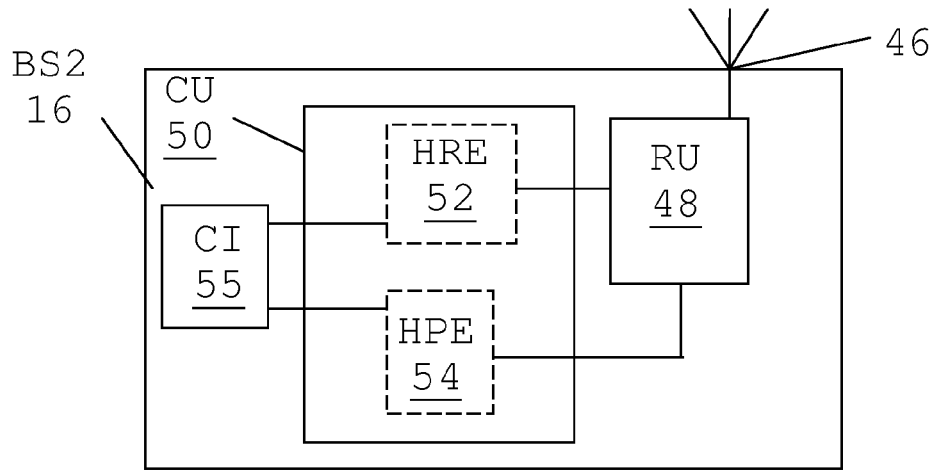
FIG. 4 shows a block schematic of a target base station according to the same embodiment of the invention.

A block schematic of one of the other base stations, the second base station 16, which is here also denoted a target base station, is shown in FIG. 4. This base station is here also denoted a node for controlling the handover process in the target cell. The node here also comprises a control unit 50, a first communication interface 46 and a second communication interface CI 55. As the node is a base station in this embodiment of the invention, the first communication interface 46 is a wireless communication interface, and here in the form of an antenna 46, which is connected to a radio communication unit RU 48. The radio communication unit 48 is in turn connected to a handover requesting element HRE 52 and to a handover processing element HPE 54, both provided in the control unit 50. The second communication interface 55 is also here an interface to the transport network used for communication between the nodes of the network and is connected to the handover requesting element 52 and to the handover processing element 54.

In a cellular network essentially being made up of macro cells there will always be areas with high traffic, i.e. high concentration of users. In those areas it is of interest to deploy additional capacity to keep the user satisfaction. The added capacity could then be in the form of an additional macro base station or to deploy nodes with lower output power and thus covering a smaller area in order to concentrate the capacity boost on a smaller area.

There will also be areas with bad coverage where there is a need for coverage extension, and again one way to do that is to deploy a node with low output power to concentrate the coverage boost in a small area.

One argument for choosing nodes with lower output power in the above cases is that the impact on the macro network can be minimized, e.g. it is a smaller area where the macro network may experience interference.

Currently there is a strong drive in the industry in the direction towards the use of low power nodes. The different terms used for this type of network deployments are Heterogeneous networks, multilayer networks or shortly HetNets.

A new principle has been introduced for location registration in the SAE/LTE networks. This principle is based on a Tracking Area (TA) concept. This concept is similar to the use of Location Areas (LA) and Routing Areas (RA) in GSM and WCDMA networks. Each E-UTRAN cell belongs to a single TA and the Tracking Area Identity (TAI) is broadcasted as part of the System Information. The TAI consists of a Mobile Country Code (MCC), a Mobile Network Code (MNC) and a Tracking Area Code (TAC).

The main difference from the LA/RA concepts is that in SAE/LTE a concept called multiple TAs or TAI List has been introduced. This means that the network may return a TAI List to the mobile station as part of some EPS Mobility Management (EMM) procedures like Attach, Tracking Area Update (TAU) and Globally Unique Temporary Identity (GUTI) Reallocation. As long as the mobile station camps on a cell belonging to a TA whose TAI is included in the current TAI List of the mobile station, the mobile station doesn't perform normal TAUs (periodic TAUs are still performed). The mobile station performs normal TAU only when it moves to a cell that doesn't belong to a TA in the TAI List. As part of this TAU the mobile station will receive a new TAI List and the same procedure continues.

As the network knows the location of the mobile station on the TAI List level, this means that the Paging Area is also normally all the TAs included in the TAI List. The Paging procedure is used to inform an idle mobile station, often termed as being in RRC-IDLE R, about an "incoming call" and the need for the mobile station to move to an active or connected state, often referred to as an RRC-CONNECTED state. Here RRC is an abbreviation for Radio Resource Control.

So in an LTE/SAE (i.e. EUTRAN and EPC) network the user location in idle mode is known in the mobile core network on the TAI List level. A TA could be the coverage area of one or more cells served by base stations. The MME knows which base stations provide coverage in a TA, so when a user should be activated, the mobile core network orders the relevant base station(s) to page the user.

Another important aspect is the relation between physical cell identifiers (PCI) and cell global identifiers. A PCI is a physical signal on the radio layer and that is used by the mobile station for separation of the different cells on which the mobile station performs measurements for mobility purposes. Cell global identifier is a unique cell identity and that is broadcasted as system information. Detecting system information is much more complicated that detecting the PCI, and is normally made by an active mode mobile station only in the serving cell. The primary and secondary synchronization signals (PSS/SSS) together encode the different LTE cells' PCI composed by a physical layer cell identity group (0 . . . 167) and a physical layer identity (0, 1 or 2). The total number of different PCIs is therefore limited to 504 and normally the PCI allocation is a demanding task in the network planning to ensure that neighboring macro cells do not use the same PCI. This also means that the PCI for a macro cell in a specific location is unique and enough to identify the macro cell. The PSS and SSS signals are constructed in a special way that makes it possible for an LTE mobile station to, after power up, find and lock onto these signals and decode the PCI. PCI is normally also used in neighboring cell measurements and measurement reporting. Similar limitations apply for the Physical Scrambling Codes (PSC) in the UTRAN case.

A base station normally has information about it's neighbours, i.e. of thee base stations in it's neighbourhood, through a so-called automatic neighbour relations (ANR) function, which information may be provided in the form of a table. In this table, the PCIs, CGIs and transport network addresses of neighbour base stations are stored. This is described in more detail in 3GPP TS 36.300.

The above arrangement may create specific issues in HetNet deployments. The "HetNet cells" are also identified with a PCI on the radio layer. One possible approach is to dedicate some of the available 504 PCIs (for example ~20 PCIs) for the HetNet cells. However, it is possible that there are more than 20 HetNet cells in the neighbourhood of one macro cell. This leads to a situation commonly called as "PCI confusion" meaning that a cell can not be identified in the neighbourhood by its PCI and that the cell global identifier (e.g. a so called E-UTRAN Cell Global Identity, E-CGI) is needed to uniquely identify a HetNet cell in the neighbourhood.

Therefore, as can be seen in FIG. 1, the second, third and fourth base stations 16, 18 and 20 all share the same non-unique cell identifier PCI2. This shared identifier is in mobile networks typically used for identifying a cell to which handover is to be performed. Furthermore, in the mobile networks of today a base station to which handover is to be performed, here also denoted a target base station, has to be prepared for the handover. This means that it has to know the entities in the core network that are handling communication with a mobile station. Such preparing is typically performed by a source base station, the base station that the mobile station is currently in contact with.

All in all, this means that when a cell identifier is shared, it would in today's networks be possible that the wrong base station is prepared for handover. This could in turn lead to a mobile station trying to get handed over to a target base station that is not prepared. When this happens connection of the mobile station may be lost and take a long time to regain, which is highly disadvantageous if the mobile station is involved in activities such as voice communication.

One way to address this is to be found in 3GPP TS 36.300 in a procedure called "inbound mobility to E-UTRAN CSG cells". The procedure 'inbound mobility' applies principles similar to ANR for letting the mobile station provide more information to the source cell to uniquely identify the target cell.

However, 'inbound mobility' has some drawbacks if it is used in every case when is possible. The main drawbacks when running 'inbound mobility' continuously are the following:

a The frequent use of 'inbound mobility' may create interruption in the ongoing transmission in the serving cell as the mobile station needs long gaps to read the E-CGI from the target cell.

b The use of 'inbound mobility' may also create delay in the handover process as the mobile station needs to retrieve additional information from the target cell.

c The support of 'inbound mobility' may be implemented as an optional feature and this would mean that then it would not be available for use with all mobile stations.

Embodiments will here be described that address this and similar issues.

Figure 7:
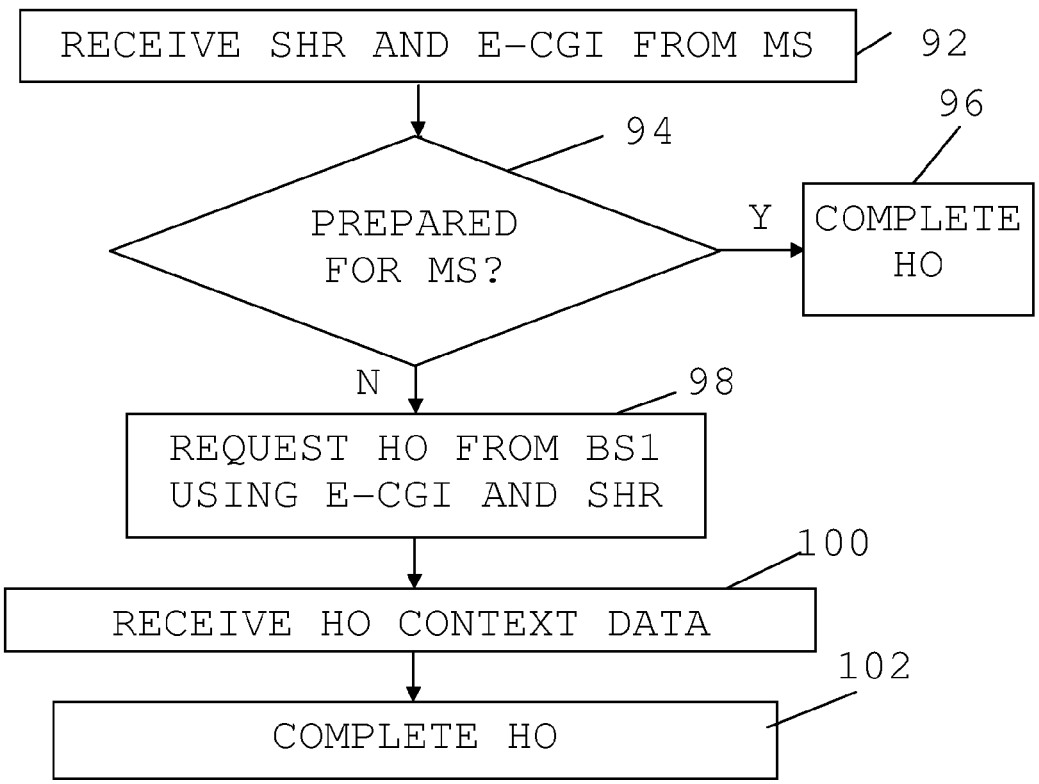
FIG. 7 shows a flow chart of a number of method steps being performed in the target base station according to the first embodiment of the invention.
Figure 5:
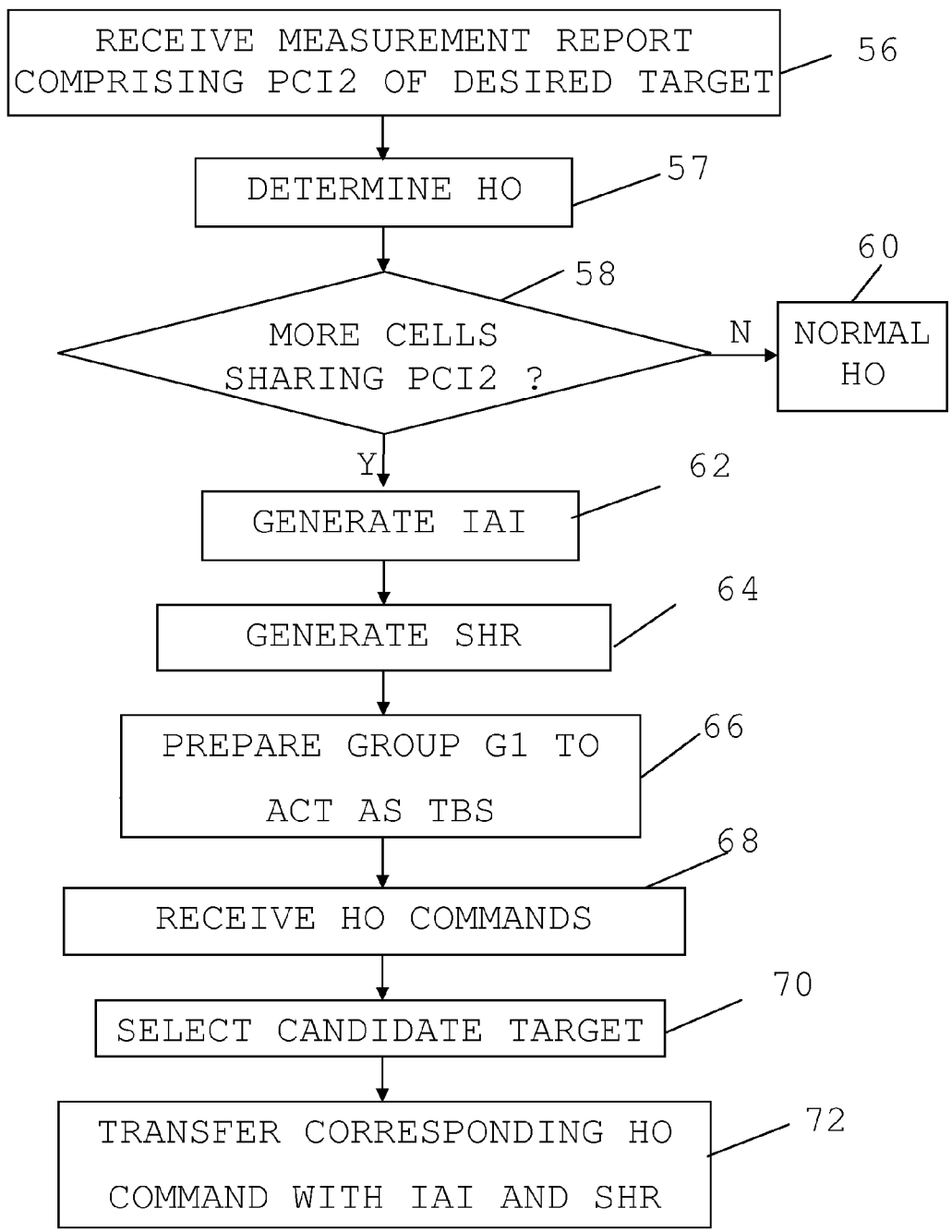
FIG. 5 shows a flow chart of a number of method steps being performed in the source base station according to the first embodiment of the invention.
Figure 6:
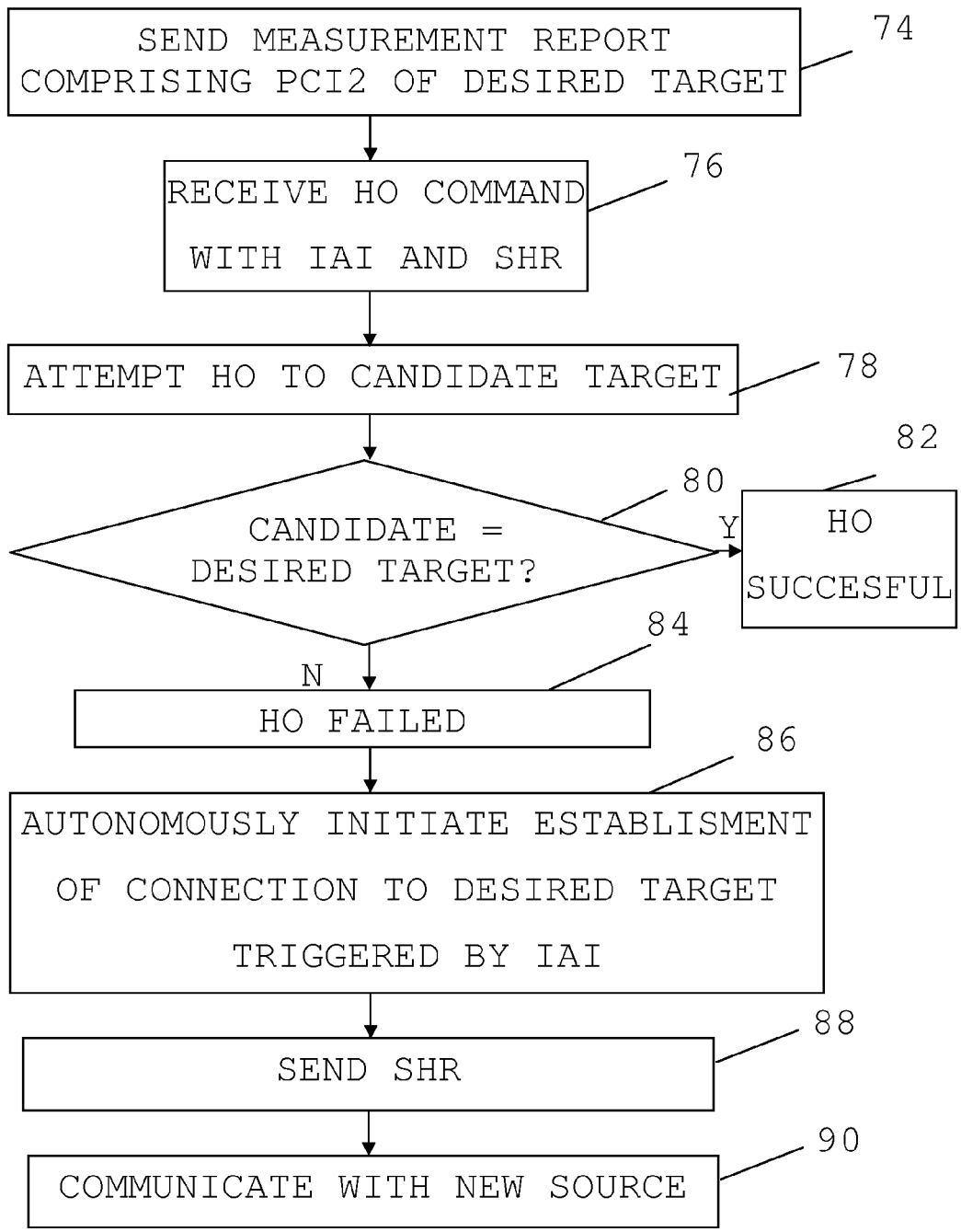
FIG. 6 shows a flow chart of a number of method steps being performed in the mobile station according to the first embodiment of the invention.
Figure 8:
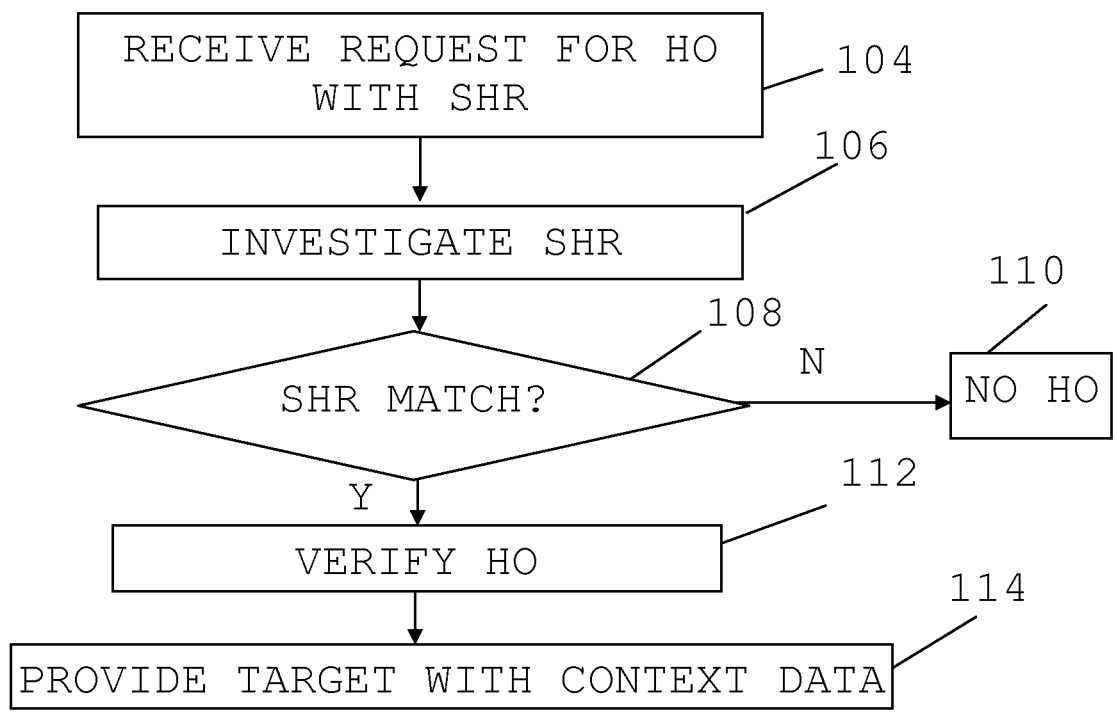
FIG. 8 shows a flow chart of a number of further method steps being performed in the source base station according to the first embodiment of the invention, FIG. 9 schematically shows signals exchanged between the mobile station, target and source base station as well as further activities in these entities when performing handover according to a first principle of the invention, FIG. 10 schematically shows signals exchanged between the mobile station, target and source base station as well as further activities in these entities when performing handover according to a second principle of the invention.

A first embodiment of the invention will now be described with reference being made to the previously described FIGS. 1-4, as well as to FIG. 5, which shows a flow chart of a number of method steps being performed in the source base station, to FIG. 6, which shows a flow chart of a number of method steps being performed in the mobile station, to FIG. 7, which shows a flow chart of a number of method steps being performed in a target base station, to FIG. 8, which shows a flow chart of a number of further method steps being performed in the source base station, to FIG. 9, which schematically shows signals exchanged between the mobile station, target and source base station as well as further activities in these entities when performing handover according to a first principle of the invention, and to FIG. 10, which schematically shows signals exchanged between the mobile station, target and source base station as well as further activities in these entities when performing handover according to a second principle of the invention.

First of all it is assumed that the first base station 14, the source base station, is aware of the fact that there are a few base stations defining cells sharing the same non-unique cell identifier, i.e. PCI2. It is here assumed that it is aware of the third and fourth base stations 18 and 20. It is here also assumed that it is also aware of the cell global identifiers of their cells. These identifiers could be obtained through having a mobile station perform ANR reporting.

ANR is a feature aiming to relieve the operator from needing to manually configure the neighbor cell lists and associations (i.e. Neighbor Relation Lists). It is currently only standardized in LTE/SAE base stations and mobile stations, but can be used to retrieve information about LTE/SAE, WCDMA and GSM neighbor cells.

The functionality is the following. The base station serving a cell, here denoted cell A, with which a mobile station is actively communicating, has an ANR function. As part of the normal procedures, the base station instructs the mobile station to perform measurements on neighbor cells. The mobile station then sends a measurement report regarding a neighboring cell, here named cell B. This report contains Cell B's PCI, but not it's E-CGI. In this example the cell B is on the same frequency/carrier as the current serving cell and the mobile station will detect cell B without having to interrupt the communication towards Cell A. The base station serving cell A instructs the mobile station, using the newly discovered PCI as parameter, to read the E-CGI, the TAC and all available Public Land Mobile Network (PLMN) ID(s) of the related neighbor cell. To do so, the base station may need to schedule appropriate idle periods to allow the mobile station to read the E-CGI from the broadcast channel of the detected neighbor cell. When the mobile station has found out the new cell's E-CGI, it reports the detected E-CGI to the serving cell base station. In addition the mobile station reports the Tracking Area Code (TAC) and all PLMN IDs that have been detected. The serving cell base station then decides to add this neighbor relation, and can use PCI and E-CGI to update the Neighbor Relation List and if needed, it could for example setup a new X2 interface towards this base station. The details of the ANR procedure are described in 3GPP TS 36.331, which is herein incorporated by reference.

The first base station 14 thus has neighbour relations for the second cell identifier PCI2 to both the third and fourth base stations BS3 and BS4, 122. However it lacks such a relation for the second base station 16. It is here also assumed that the mobile station 12 is actively communicating with a cell provided by the first base station 14, 124. While being active on a cell the mobile station 12 possesses the cell global identifier CGI as is provided by system information in this cell. Next the mobile station 12 approaches a cell having the second shared cell identifier PCI2, 126, which approached cell may be defined by a desired target base station, i.e. by a base station to which handover may become necessary. As the mobile station does this it measures the quality of the connection to the approached target base station, for instance through performing radio link measurements. In this first embodiment of the invention the event reporting element 42 is responsible for such measurements and therefore it obtains measurement data via the radio communication unit 38 and reports selected measurement data in the form of an event to the first base station 14. The event reporting element 42 thus sends 128 an event in the form of a measurement report comprising the second shared cell identifier PCI2 of a desired target base station to the first base station, step 74, which sending is performed using the radio communication unit 38 and antenna 36. In the example given for describing the first embodiment of the invention, the approached cell is provided by the second base station 16.

Figure 9:
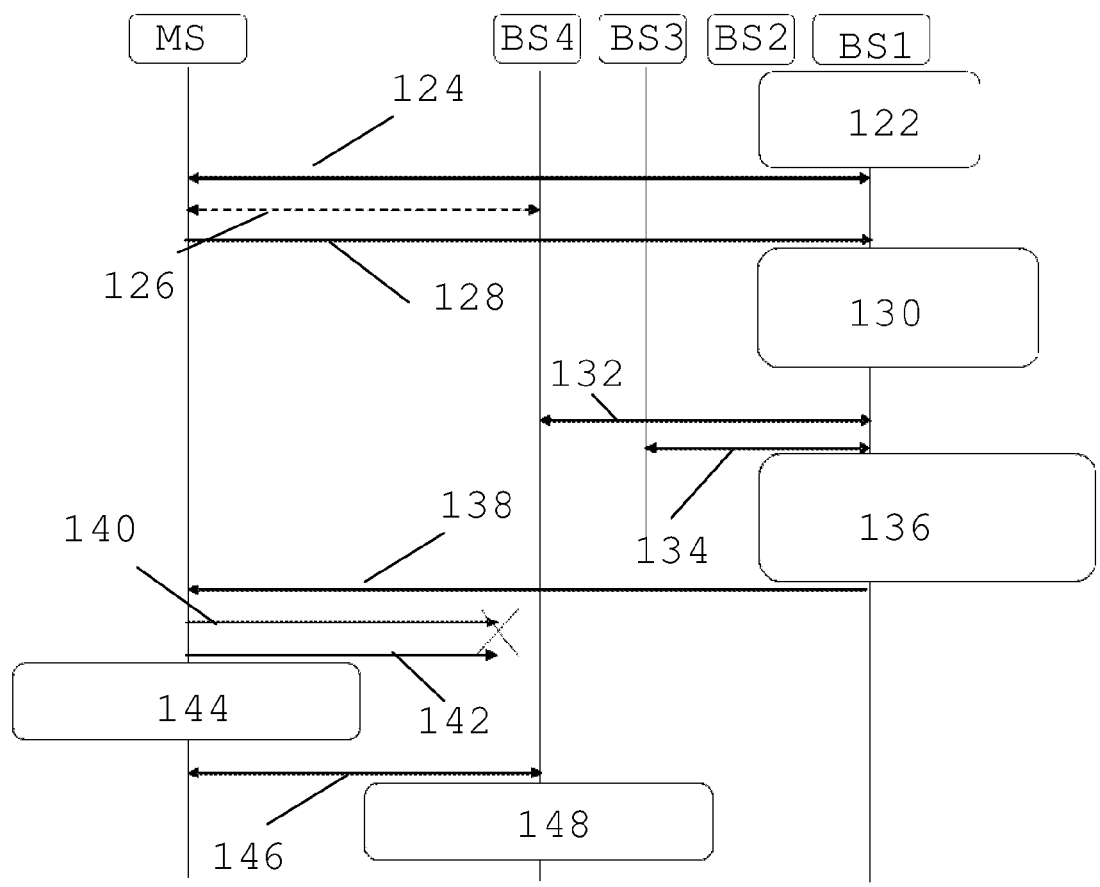
Figure 10:
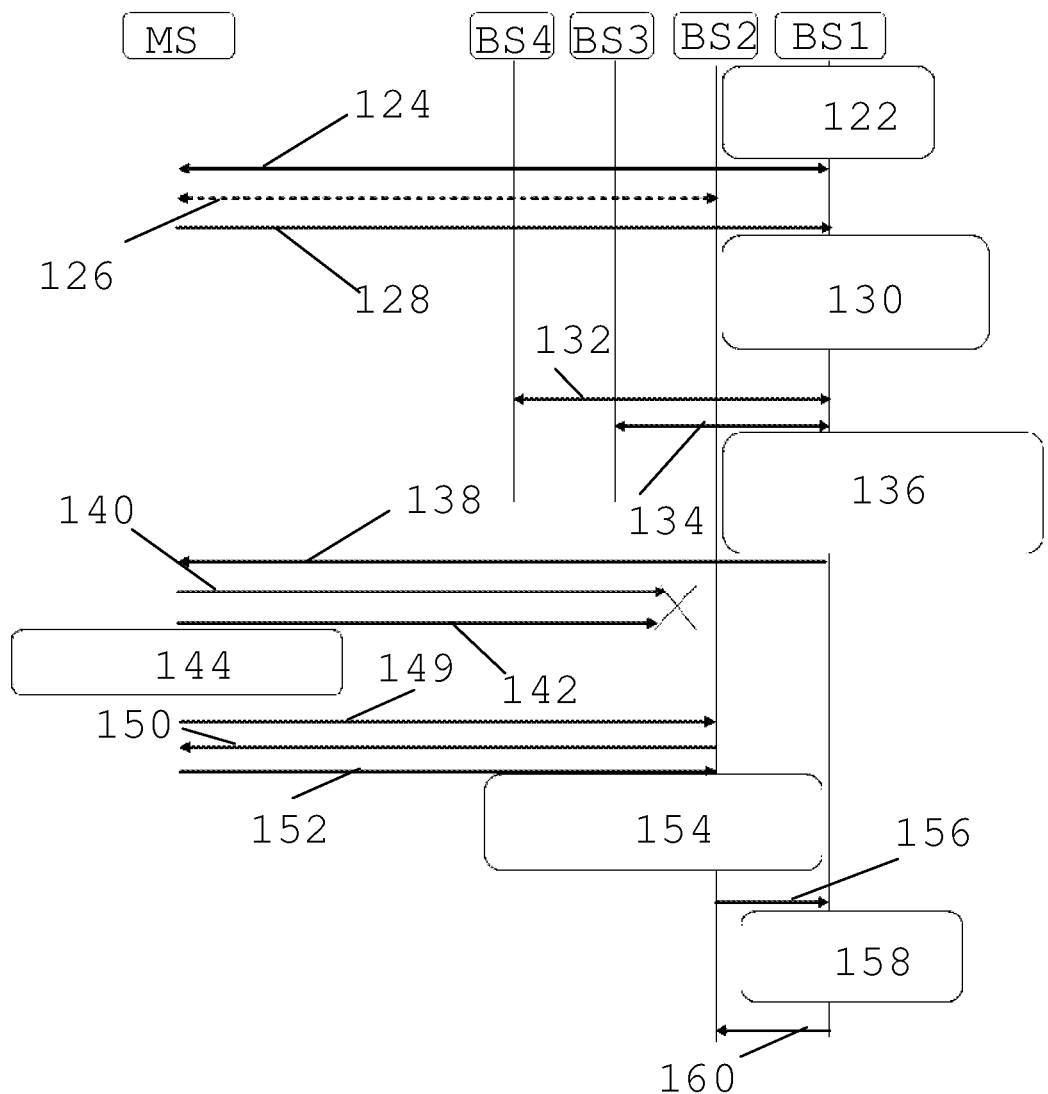

The signals exchanged in FIG. 10 are signals exchanged between the first and second base stations 14 and 16. However, the signals shown in FIG. 9 are related to another situation, when the cell that the mobile station approaches is provided by the fourth base station 20.

The event, which here comprises the cell identifier PCI2, is then received by the first base station 14. It is here more particularly received by the handover deciding element 30 via the radio communication unit 26 and antenna 24, step 56. Based on the values in this report, the handover determining element 30 then determines if a handover is to be performed to the target base station or not. In the present example a handover is deemed necessary, why the handover deciding element 30 determines that a handover is to be made, step 57. It thus determines that the mobile station needs to be handed over to the target base station. This type of determination is performed in a conventional way using well known measures. However, the handover deciding element 30 also provides the second cell identifier PCI2 to the investigating element 31 in order to find out if it is unique in the neighbourhood or environment or if there is more than one neighbour cell that shares the cell identifier PCI2.

The investigating element 31 therefore investigates if there are more cells in the neighbourhood sharing the cell identifier PCI2, step 58, and if not, goes ahead and informs the handover deciding element 30 to perform normal handover in conventional fashion, which it then does, step 60. However in case the cell identifier PCI2 is shared, the control unit 28 detects that there is an ambiguity concerning the identity of the target cell and decides that a special type of handover is to be performed, 130.

More particularly the investigating element 31 in this first embodiment provides an identity ambiguity indicator IAI if there are more cells sharing the cell identifier PCI2. The identity ambiguity indicator IAI is more particularly generated by the investigating element 31, step 62. It also generates a secure handover reference SHR, step 64. The identity ambiguity indicator is typically a flag that signals to the mobile station that the target cell is not uniquely identified and the handover therefore should be treated in a special way, while the secure handover reference may be an identifier, such as a unique number or string of symbols assigned to the actual handover to be performed. The secure handover reference may also be an encrypted identifier created based on information related to the mobile station or the current session of the mobile station. The identify ambiguity indicator IAI and secured handover reference SHR are then both provided from the investigating element 31 to the handover deciding element 30. As the handover deciding element 30 receives these it instructs the group handling element 32 to prepare the known base stations having the second cell identifier PCI2, i.e. the base stations having the second cell identifier PCI2 of which the first base station 14 is aware.

The group handling element 32 then prepares the third and fourth base stations 18 and 20 for a handover, step 66. It thus prepares the third and the fourth base stations 18 and 20 to act as target base stations in the handover. This preparing involves exchanging data 132 with the fourth base station 20 and exchanging data 134 with the third base station 18. The data sent to these base stations 18 and 20 may here comprise data identifying the MME element and gateway in the core network handling functionality for the mobile station and the data received from the third and fourth base stations 18 and 20 that are being prepared may be a handover command. Such commands are described in more detail in 3GPP TS 23.401 for S1 based handovers and in 3GPP TS 36.300 for X2 based handovers. Here is also possible that some base stations do not respond with a handover command.

The group handling element 32 therefore receives a handover command from at least one of the base stations in the group of prepared radio base stations, step 68, and then selects one of the prepared base stations to act as a candidate base station, step 70 and 136. In this example the selected base station is the third base station 18. The handover command from the selected candidate base station is then forwarded to the handover deciding element 30. The handover deciding element 30 thereafter transfers the handover command of the selected candidate base station to the mobile station 12 together with the identity ambiguity indicator IAI and secured handover reference SHR as a handover instruction 138.

The handover instruction 138, which thus comprises the selected handover command, the identity ambiguity indicator IAI and the secured handover reference SHR, is then received by the handover handling element 44 of the mobile station 12, step 76.

The handover handling element 44 then tries to perform handover to the candidate target base station using the received handover command, step 78. This may involve synchronization 140 to the new cell and trying to perform an RRC Connection Reconfiguration Complete activity 142. In case the candidate target is the desired target base station, step 80, then handover is successful, step 82. However, in the present example the third base station 18, which is the candidate base station is not the desired target base station and therefore the handover fails, step 84. The handover is thus unsuccessful 144.

The handover handling element 44 of the mobile station 12 therefore now autonomously initiates the establishment of a connection to the desired target base station, step 86. This initiation is furthermore triggered by the identity ambiguity indicator. This may be done as soon as the handover to the candidate target base station fails. This may also be seen as the indicator specifying the time at which the connection is to be set up after a failed handover. Here the handover handling element 44 also sends the secured handover reference SHR to the target base station, step 88.

In case the desired target was the fourth base station 20, which is depicted in FIG. 9, the mobile station may access the cell that is defined by the fourth base station 20 and under control of the handover handling element 44 perform an RRC connection re-establishment together with the target base station, 146. As the fourth base station 20 was prepared, it would then identify the previous handover preparation phases and thereafter perform handover in known fashion, 148. At successful access the target base station instructs the source base station to release the connection to the mobile station 12, which it then does. The mobile station thereafter communicates with the new source, the fourth base station, step 90.

However, in the present example, the desired target is the second base station 16, which has not been prepared. In this situation the handover handling element 44 of the mobile station may send an RRC Connection Reestablishment Request 149, which would be accompanied by an identifier of the source base station, i.e. of the first base station 14, the secured handover reference and perhaps also the identify ambiguity indicator. The identifier of the source base station may here be the E-CGI of the source base station The identifier could also be another type of identifier. Here it is also possible that an identifier of the mobile station is included, such as a Cell Radio Network Temporary Identifier (C-RNTI).

The handover requesting element 52 of the target base station thus receives the secured handover reference SHR and E-CGI from the mobile station 12, step 92, for instance in an RRCConnectionReestablishmentRequest message 149, to which it responds with an RRCConnectionReestablishment message 150, after which the handover handling element responds with an RRCConnectionReestablishmentComplete message 152. Thereafter the handover requesting element 52 investigates if it has been prepared for handover. In case it has, step 94, then handover is completed, step 96. However in the present example it has not been prepared, step 94. The handover requesting element 52 therefore notices that there has been no handover preparation and therefore triggers a so-called backwards context fetching procedure, 154.

This procedure involves requesting a handover from the first base station 14, the source base station, using the first base station identifier, here the E-UTRAN cell global identifier E-CGI and the secured handover reference SHR, step 98, 156.

This request is received by the handover verifying element 34 of the first base station 14, step 104. The handover verifying element 34 then investigates the received secured handover reference, step 106 and 158, and more particularly compares it with the secured handover reference SHR generated earlier in relation to the investigation of cell identifiers. In case there is no match between the generated and received secured handover reference, step 108, then there is no handover, step 110. However if they match, step 108, the handover is verified to the desired target base station, step 112, and the target is provided with context data, step 114 and 160. Context data is here typically the above described information concerning MME and gateway associated with the mobile station 12.

The desired target base station then receives the handover context data, step 100, which data is received in the handover processing element 54. The handover processing element may then connect to the appropriate MME in the core network which the context data points at, which MME may in turn connect to the appropriate gateway and thereafter handover is completed, step 102, through the target base station finalizing the remaining parts of the handover procedure, e.g. performing path switching towards the core network to update the new location of the mobile station. After this has been done, the mobile station 12 now communicates with the new source, the second base station 16, step 90.

Figure 11:
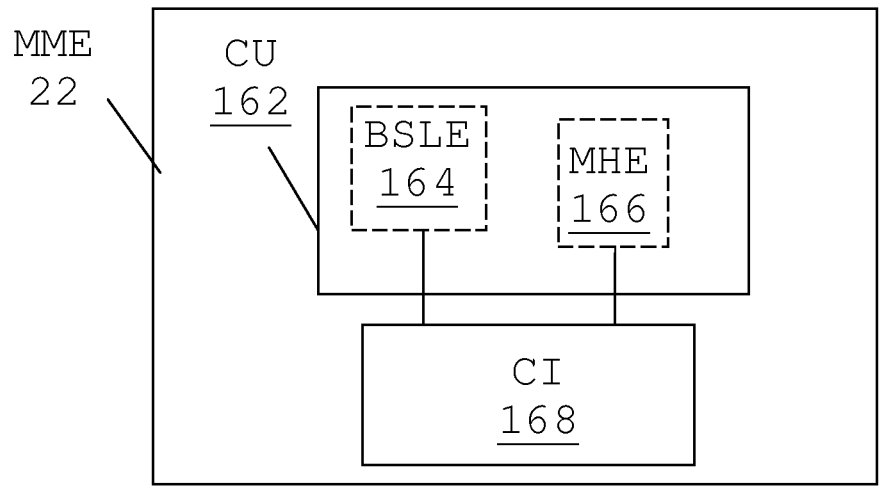
FIG. 11 shows a block schematic of a network node involved in handover according to the first embodiment.
Figure 12:
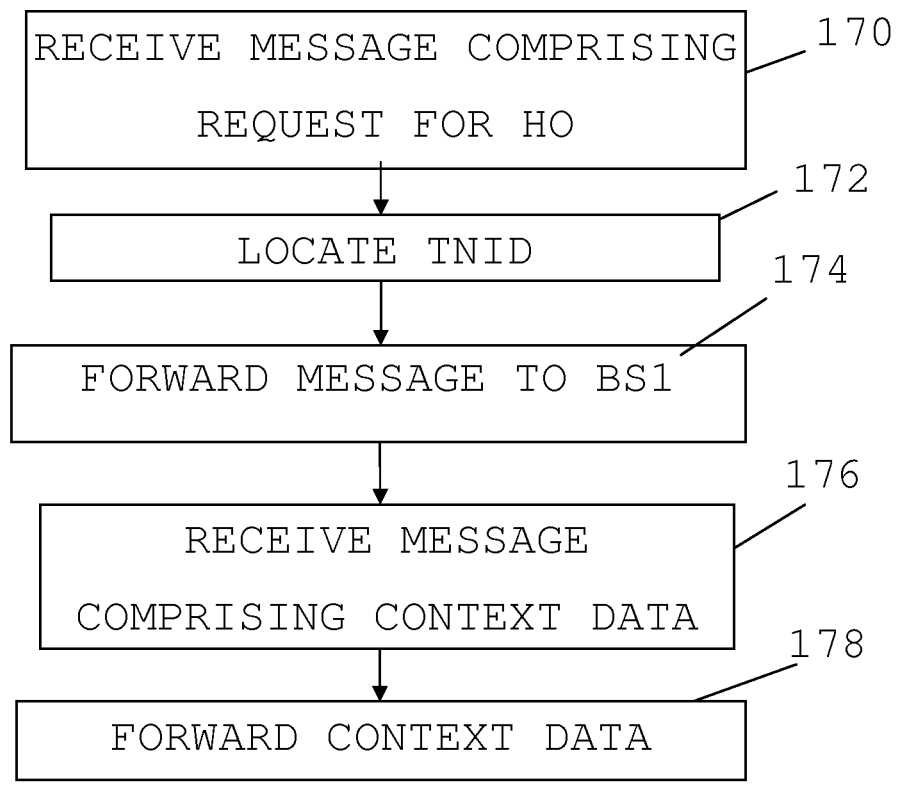
FIG. 12 shows a flow chart of a number of method steps being performed by the network node according to the first embodiment.

In the communication between the desired target base station and the source base station the communication is in the first embodiment performed using the S1 interface. This situation will now be described in more detail with reference being made to FIGS. 11 and 12, where FIG. 11 schematically shows a block schematic of a network node involved in assisting of handover and FIG. 12 shows a flow chart of a number of method steps being performed by this network node.

The network node 22 comprises a control unit CU 162 connected to a communication interface CI 168. In the control unit 162 there is a base station locating element BSLE 164 and a message handling element MHE 166.

In this example the handover requesting element 52 of the desired target base station sends the request for handover as a message addressed to the network node 22 via the communication interface 55. The message also comprises, in addition to the previously described request for handover with the E-CGI and SHR, an own transport network identifier. Here the E-CGI is an identifier identifying the source base station and the own transport network identifier is an identifier identifying the target base station. As an alternative the source base station identifier may be a transport network identifier or a PCI, while the target base station identifier as an alternative may be an E-CGI.

This message is then received in the network node 22 by the base station location element 164 via the communication interface 168, step 170. Based on this message and above all based on the E-CGI of the source base station 14, the base station location element 164 here locates a transport network identifier TNID, such as an IP address of the first base station 14, step 172, and then forwards the message to the first base station 14 using the located transport network identifier TNID, step 174. The base station location element 164 may also use the E-CGI of the source base station to select the correct S1-interface towards the source base station.

The message is then received by the handover verifying element 34 of the source base station 14. It should here be noted that the message is not received via the wireless interface 24, but via the communication interface 35. The handover verifying element 34 then verifies the handover in the previously described way and returns a response with configuration context data or handover context data together with the identifier of the target base station to the network node 22, where the response message with context data is received by the message handling element 166 via the communication interface 168. The context data is then forwarded from the message handling element 166 to the target base station 16 via the communication interface 168 based on the identifier of the target base station. Also here the E-CGI of the target base station may be used to select the correct S1-interface towards the target base station.

The context data is then received by the handover performing element 54 of the target base station 16 via the communication interface 55 and thereafter the handover performing element 54 performs handover in the previously described way.

This was the general description of a first embodiment of the invention. It should here be realized that a number of variations are possible.

In the above described embodiment of the invention the target and source base stations communicated with each other using a node in the core network. It should here be realized that the communication between these base stations could as an alternative be made using the X2 interface instead.

Likewise the use of a preparation of a base station for handover was described in relation to communication over the X2 interface, i.e. the handover is mainly signaled using the X2 interface inside E-UTRAN. It should here be realized that handover preparation may just as well be performed using a network node as a relay, like MME 22, using the S2 interface, where the handover is mainly signaled using the S1 interface between E-UTRAN and EPC.

In the above described embodiment, the handover handling node and the node for controlling the handover process in the target cell were both base stations. It should here be realized that as an alternative they may be provided as other entities, such as a radio network controller, (RNC) controlling one or more base stations.

Further in the above described embodiment two ways of handing over were described, one when a base station had been prepared and the other when it had not. It should here be realised that the invention may use only one of these methods, either a prepared base station or unprepared base station combined with a secured handover reference. In the case of only providing prepared base stations, then the secured handover reference could be omitted. In the latter case, when no base stations are prepared, the secured handover reference may be combined with the identity ambiguity indicator. This means that the secured handover reference could also function as an ambiguity identity indicator. The secure handover reference may thus also indicate that there is an ambiguity concerning the cell identifier.

Figure 13:
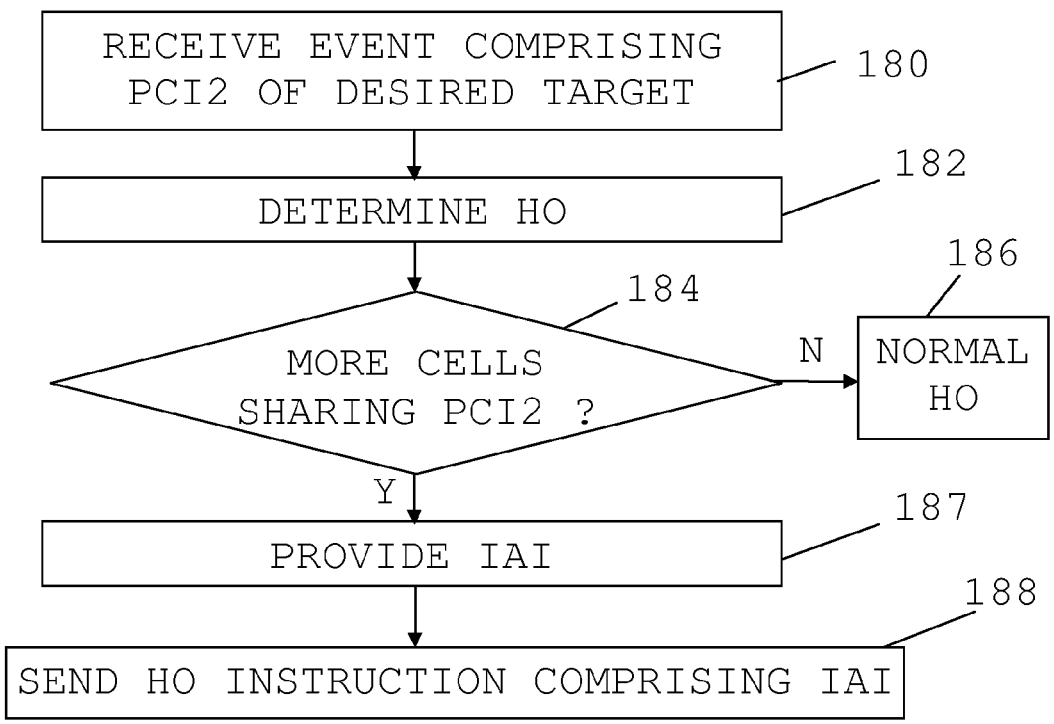
FIG. 13 shows a flow chart of a number of method steps being performed in the source base station according to a second general embodiment of the invention.
Figure 14:
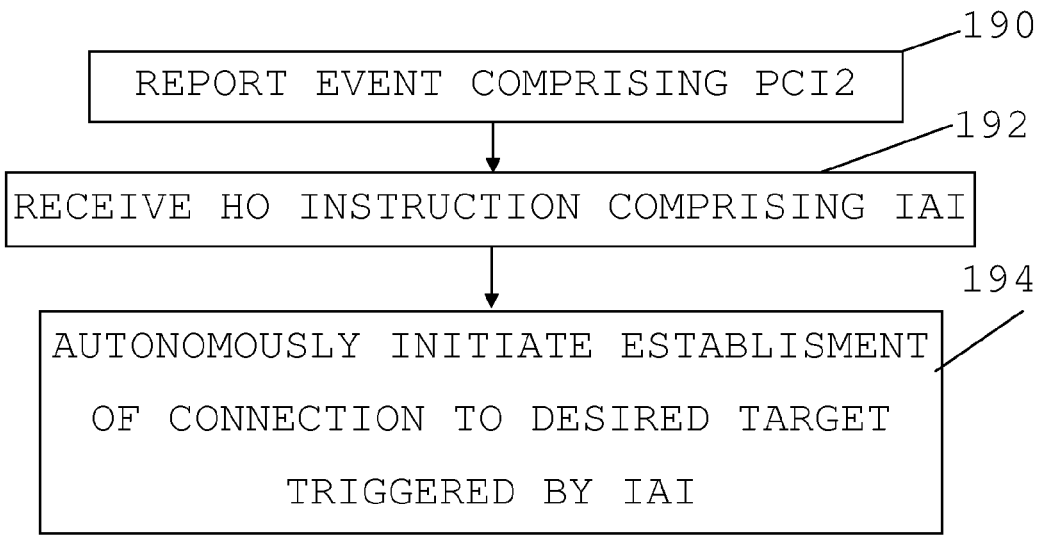
FIG. 14 shows a flow chart of a number of method steps being performed in the mobile station according to the second general embodiment of the invention.

The method steps of a more general method being provided by the first base station 14 and the mobile station 12 are shown in FIGS. 13 and 14.

In this more general method the mobile station 12 reports an event comprising the second cell identifier PCI2, step 190, in the same way as was described in relation to the first embodiment.

This event is received by the handover deciding element 30 of the first base station 14 in the same way as was described in the first embodiment, step 180, and then handover is determined, step 182, which is again followed by a determination of if there are more cells sharing the same cell identifier PCI2 by the investigating element 31, step 184. In case only one in the neighbourhood had the cell identifier PCI2, step 184, then normal handover is provided, step 186, and in case not then an identity ambiguity indicator is provided, step 187, and a handover instruction comprising the identity ambiguity indictor is being sent by the handover deciding element 52, step 188.

The mobile station 12 then receives the handover instruction comprising the identity ambiguity indicator from the source base station 14, step 192, and thereafter autonomously initiates the establishment of a connection to the desired target base station as triggered by the identity ambiguity indicator, step 194. Here the target base station would complete the handover if it was prepared and request handover if case it is not.

The present invention has a number of advantages. It allows safe handover even though there is an ambiguity regarding the identity of a desired target cell. This handover may furthermore be fast, even if an initial handover attempt fails.

There are many variations that can be made to the invention apart from those already mentioned. It is for instance possible that the non-unique cell identifier is found to be such merely because it lies within a certain identifier range, for instance a range assigned to pico or femto cells. An identity ambiguity indicator and possibly also a secured handover reference may then be provided as soon as the handover is decided to be made to a cell identifier in such a range.

The various control units described earlier may each be provided in the form of a processor with associated program memory including computer program code for performing the functionality of the corresponding elements. It should be realized that the control units may also be provided in the form of hardware, like for instance in the form of ASICs circuit.

The radio communication units may typically be made up of conventional baseband coding element and modulating elements and amplifying elements.

In the examples given above the base stations were described as comprising only one antenna. It should however be realised that they may comprise more antennas.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims. This invention has for instance been exemplified with E-UTRAN and EPC (i.e. LTE/SAE). However it should be realized that the invention can be used in other mobile networks.

The invention claimed is:

1. A method performed by a handover handling node for handing over a mobile station from a source cell to a target cell in a wireless communication network when the identity of the target cell is ambiguous, the method comprising:

receiving from a mobile station a measurement report that includes a cell identifier associated with a cell that is a prospective target for handover, determining, based on said report, that the mobile station is to be handed over to said cell as the target cell, investigating whether or not other cells neighboring said target cell share said cell identifier with said target cell, if other cells neighboring said target cell share said cell identifier with said target cell, generating an identity ambiguity indicator that indicates the target cell is not uniquely identified and that will trigger the mobile station to autonomously initiate establishment of a connection to a target base station defining said target cell responsive to failure of handover to a candidate base station defining a cell that shares said cell identifier with said target cell, and sending a handover instruction to the mobile station that includes the identity ambiguity indicator, wherein the handover instruction comprises a handover command from the candidate base station, and the identity ambiguity indicator triggers the mobile station to initiate establishment of a connection to the target base station irrespective of whether the mobile station receives a handover command from the target base station.

2. The method according to claim 1, further comprising:

preparing each base station in a group of base stations for handover, wherein the base stations in the group define cells that share said cell identifier with said target cell, receiving a handover command from at least one base station in the group, and selecting one of the base stations from which a handover command was received to act as the candidate base station, wherein said sending comprises including the handover command received from the candidate base station in the handover instruction.

3. The method according to claim 1, further comprising generating a secured handover reference associated with the handover to be performed, wherein said sending comprises including the secured handover reference in the handover instruction, and wherein the method further comprises:

receiving, from a further base station, a request for handover of said mobile station together with a secured handover reference, investigating whether or not the received secured handover reference matches the generated secured handover reference, and if the received secured handover reference matches the generated secured handover reference, providing the further base station with handover context data.

4. The method according to claim 3, wherein the secured handover reference also serves as the identity ambiguity indicator.

5. The method according to claim 1, wherein the identity ambiguity indicator specifies a time at which the mobile station is to initiate establishment of the connection to the target base station after failure of handover to the candidate base station.

6. A handover handling node in a wireless communication network for handing over a mobile station from a source cell to a target cell when the identity of the target cell is ambiguous, the node comprising:

a communication interface, and
a control unit comprising
a handover deciding circuit configured to
receive from a mobile station a measurement report that includes a cell identifier associated with a cell that is a prospective target for handover, and
determine, based on said report, that the mobile station is to be handed over to said cell as the target cell, and
an investigating circuit configured to
investigate whether or not other cells neighboring said target cell share said cell identifier with said target cell, and
if other cells neighboring said target cell share said cell identifier with said target cell, generate an identity ambiguity indicator that indicates the target cell is not uniquely identified and that will trigger the mobile station to autonomously initiate establishment of a connection to a target base station defining the target cell responsive to failure of handover to a candidate base station defining a cell that shares said cell identifier with said target cell,
wherein the handover deciding circuit is configured to send a handover instruction to the mobile station that includes said identity ambiguity indicator, wherein the handover instruction comprises a handover command from the candidate base station, and the identity ambiguity indicator triggers the mobile station to initiate establishment of a connection to the target base station irrespective of whether the mobile station receives a handover command from the target base station.

7. The handover handling node according to claim 6, further comprising a group handling circuit configured to:
prepare each base station in a group of base stations for handover, wherein the base stations in the group define cells that share said cell identifier with said target cell,
receive a handover command from at least one base station in the group, and
select one of the base stations from which a handover command was received to act as the candidate base station,
wherein the handover deciding circuit is configured to include the handover command received from the candidate base station in the handover instruction.

8. The handover handling node according to claim 6, wherein the investigating circuit is further configured to generate a secured handover reference associated with the handover to be performed, wherein the handover deciding circuit is configured to include the secured handover reference in the handover instruction, and wherein the handover handling node further comprises a handover verifying circuit configured to:
receive, from a further base station, a request for handover of said mobile station together with a secured handover reference,
investigate whether or not the received secured handover reference matches the generated secured handover reference, and
if the received secured handover reference matches the generated secured handover reference, provide the further base station with handover context data.

9. The handover handling node according to claim 8, wherein the secured handover reference also serves as the identity ambiguity indicator.

10. The handover handling node of claim 6, wherein the identity ambiguity indicator specifies a time at which the mobile station is to initiate establishment of the connection to the target base station after failure of handover to the candidate base station.

11. A method in a mobile station for hand over from a source cell to a target cell in a wireless communication network when the identity of the target cell is ambiguous, the method comprising:
sending a measurement report to a source base station that includes a cell identifier associated with a cell that is a prospective target for handover,
receiving a handover instruction from a source base station that defines said source cell, wherein said handover instruction comprises a handover command from a candidate base station defining a cell that shares said cell identifier with said target cell and includes an identity ambiguity indicator that will trigger the mobile station to autonomously initiate establishment of a connection to a target base station defining said target cell responsive to failure of handover to the candidate base station, and
responsive to reception of said identity ambiguity indicator and failure of handover to the candidate base station, autonomously initiating the establishment of a connection to the target base station irrespective of whether the mobile station receives a handover command from the target base station.

12. The method according to claim 11, wherein the method further comprises attempting handover to the candidate base station using the received handover command.

13. The method according to claim 11, wherein the handover instruction includes a secured handover reference, and wherein autonomously initiating the establishment of a connection to the target base station comprises sending the secured handover reference to the target base station.

14. The method of claim 11, wherein the identity ambiguity indicator specifies a time at which the mobile station is to initiate establishment of the connection to the target base station after failure of handover to the candidate base station.

15. A mobile station configured to be handed over from a source cell to a target cell in a wireless communication network when the identity of the target cell is ambiguous, the mobile station comprising a wireless communication interface, a radio communication unit, and a control unit comprising:
an reporting circuit configured to send a measurement report to a source base station that includes a cell identifier associated with a cell that is a prospective target for handover, and
a handover handling circuit configured to:
receive a handover instruction from a source base station that defines said source cell, wherein said handover instruction comprises a handover command from a candidate base station defining a cell that shares said cell identifier with said target cell and includes an identity ambiguity indicator that will trigger the mobile station to autonomously initiate establishment of a connection to a target base station defining said target cell responsive to failure of handover to the candidate base station, and
responsive to reception of said identity ambiguity indicator and failure of handover to the candidate base station, autonomously initiate the establishment of a connection to the target base station irrespective of whether the mobile station receives a handover command from the target base station.

16. The mobile station according to claim 15, wherein the handover handling circuit is configured to attempt handover to the candidate base station using the received handover command.

17. A mobile station according to claim 15, wherein the handover instruction includes a secured handover reference and wherein the handover handling circuit is further configured to send the secured handover reference to the target base station when autonomously initiating the establishment of a connection to the target base station.

18. The mobile station of claim 15, wherein the identity ambiguity indicator specifies a time at which the mobile station is to initiate establishment of the connection to the target base station after failure of handover to the candidate base station.

19. A method in a target cell of a wireless communication network for controlling handover of a mobile station from a source cell to the target cell when the identity of the target cell is ambiguous, wherein the source cell is defined by a source base station and the target cell is defined by a target base station, wherein the method comprises:
  receiving a secured handover reference and a cell identifier of the source cell from the mobile station via a connection autonomously initiated by said mobile station responsive to the mobile station failing to handover to a candidate base station defining a cell that shares said cell identifier with said target cell, irrespective of whether the mobile station received a handover command from the target base station, and based on an identity ambiguity indicator that the mobile station received from the source base station and that indicated the target cell is not uniquely identified,
  requesting handover of the mobile station from the source cell using the secured handover reference,
  receiving handover context data from the source base station as a response to the request, and
  completing handover of the mobile station to the target cell.

20. The method according to claim 19, wherein the request is sent directly to the source base station.

21. The method according to claim 19, wherein the request is sent to a routing node for forwarding to the source base station.

22. A node for controlling handover of a mobile station from a source cell to the target cell when the identity of the target cell is ambiguous, wherein the source cell is defined by a source base station and the target cell is defined by a target base station, wherein the node comprises a communication interface and a control unit comprising:
  a handover requesting circuit configured to:
    receive a secured handover reference and a cell identifier of the source cell from the mobile station via a autonomously initiated by said mobile station responsive to the mobile station failing to handover to a candidate base station defining a cell that shares said cell identifier with said target cell, irrespective of whether the mobile station received a handover command from the target base station, and based on an identity ambiguity indicator that the mobile station received from the source base station and that indicated the target cell is not uniquely identified,
    request handover of the mobile station from the source cell using the secured handover reference, and
  a handover processing circuit configured to:
    receive handover context data from the source base station as a response to the request, and
    complete handover of the mobile station to the target cell.

23. A method of assisting in the handing over of a mobile station from a source cell defined by a source base station to a target cell defined by a target base station in a wireless communication network when the identity of the target cell is ambiguous, comprising:
  responsive to the mobile station failing to handover to a candidate base station defining a cell that shares said cell identifier with said target cell, and irrespective of whether the mobile station received a handover command from the target base station, receiving a message from the target base station, wherein the message comprises a request for handover of the mobile station and includes a secured handover reference associated with the handover to be performed, an identifier of the source base station, and an identifier of the target base station,
  locating a transport network identifier of the source base station based on said identifier of the source base station,
  forwarding the message to the source base station using said transport network identifier,
  receiving a message from the source base station that, as a response to the request, includes handover context data and said identifier of the target base station, and
  forwarding the handover context data to the target base station based on said identifier of the target base station.

24. A network node of a wireless communication network for assisting in the handing over of a mobile station from a source cell defined by a source base station to a target cell defined by a target base station when the identity of the target cell is ambiguous, the network node comprising a communication interface and a control unit that comprises:
  a base station locating circuit configured to
    responsive to the mobile station failing to handover to a candidate base station defining a cell that shares said cell identifier with said target cell, and irrespective of whether the mobile station received a handover command from the target base station, receive a message from the target base station, wherein the message comprises a request for handover of the mobile station and includes a secured handover reference associated with the handover to be performed, an identifier of the source base station, and an identifier of the target base station, and
    locate a transport network identifier of the source base station based on said identifier of the source base station, and
  a message handling circuit configured to
    forward the message to the source base station using said transport network identifier,
    receive a message from the source base station that, as a response to the request, includes handover context data and said identifier of the target base station, and
    forward the handover context data to the target base station based on said identifier of the target base station.

* * * * *